G. R. PAALEN.
DOUBLE WALLED VESSEL.
APPLICATION FILED JUNE 27, 1908.

950,557.

Patented Mar. 1, 1910.

Witnesses:

Inventor:

UNITED STATES PATENT OFFICE.

GUSTAV ROBERT PAALEN, OF BERLIN, GERMANY, ASSIGNOR TO AMERICAN THERMOS BOTTLE COMPANY, OF BROOKLYN, NEW YORK.

DOUBLE-WALLED VESSEL.

950,557.

Specification of Letters Patent.   Patented Mar. 1, 1910.

Application filed June 27, 1908.   Serial No. 440,673.

*To all whom it may concern:*

Be it known that I, GUSTAV ROBERT PAALEN, a subject of the German Emperor, and resident of Berlin, Germany, have invented a new and useful Improvement in Double-Walled Vessels, of which the following is a specification.

This invention relates to improvements in double walled vessels comprising inner and outer walls united with each other only at the mouth of the vessel and inclosing between them a rarefied space and has for its object to provide a protective casing for the vessel, said protective casing being of such form that the contents of the vessel may be readily poured therefrom.

Figure 1:
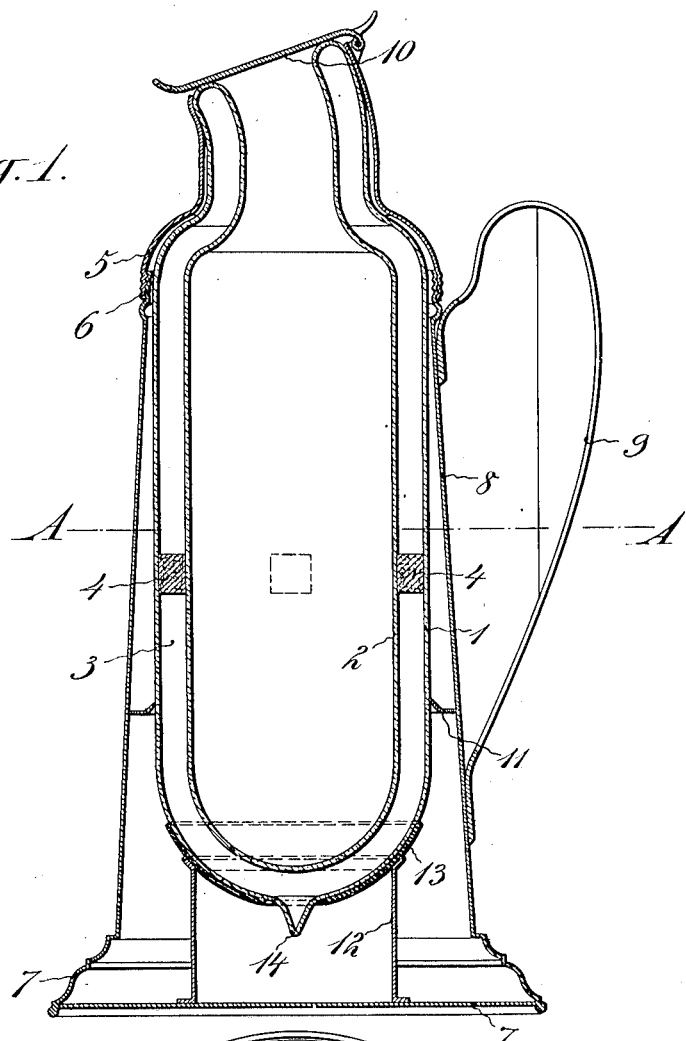
Figure 2:
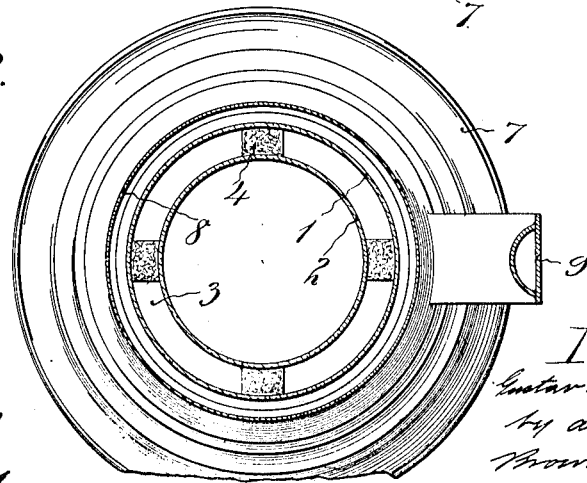

In the accompanying drawings, Figure 1 represents the invention in vertical central section, and Fig. 2 is a transverse section taken in the plane of the line A—A of Fig. 1.

The double walled vessel comprises an outer wall 1, an inner wall 2 united with each other only at the mouth of the vessel and inclosing between them a rarefied space 3.

Stiffening devices 4 of any desired form may be interposed between the inner and outer walls for spacing the inner wall from the outer wall at a distance from the mouth of the vessel.

The neck of the vessel may be curved as shown for facilitating the pouring of the liquid therefrom.

The jacket for the double walled vessel comprises an upper member 5, which embraces the neck and shoulder of the vessel, and a lower member having a removable engagement with the upper member, as, for instance, by a screw threaded connection 6. This lower member comprises a base 7 and a slightly conical portion 8 uprising from the base. A suitable handle 9 is attached to the conical portion 8 of the lower member of the jacket.

A lid 10 is hinged to the upper member 5 of the jacket in position to close the mouth of the vessel.

A spacing ring 11 serves to space the lower portion of the vessel from the walls of the conical portion 8 of the lower member of the jacket.

The vessel is supported at its bottom and is held firmly pressed upwardly into the upper member 5 of the jacket by providing a hollow standard 12 uprising from the base 7 of the jacket about centrally with respect thereto.

An elastic cushion 13 is interposed between the top of the standard 12 and the bottom of the outer wall of the vessel. This hollow standard 12 also serves to thoroughly protect the sealing teat or teats 14. In the present instance, one centrally arranged teat is shown.

It will be seen that the double walled vessel is not only thoroughly protected by the surrounding jacket but also that the vessel may be very readily removed from the jacket by detaching the lower member from the outer member. It will also be observed, that by reason of the shape of the neck of the vessel, the upper member of the jacket engages therewith so as to be non-rotatable thereon.

In assembling the parts, the upper jacket member is first put in place. The lower member, with the standard 12 and spacing or centering ring 11 in position, is then adjusted to effect engagement of the screw-threaded connection. The lower member then being rotated, the standard 12 pushes the shoulder into close contact with the upper member of the jacket, thus forming a close joint which prevents leakage of liquid over the lip of the vessel into the space between vessel and jacket. The inner circumferential edge of the ring 11 is upwardly inclined so as to fit closely upon the vessel, and so that when the jacket is moved longitudinally thereon, as above described, the friction tends to force said inner edge more tightly upon the bottle surface.

What I claim is:—

1. The combination with a double walled vacuum vessel of the type set forth, of a jacket formed in separable upper and lower portions, a screw-threaded connection between said portions, and means for securing the upper portion of said jacket non-rotatably to said vessel.

2. The combination with a double walled vacuum vessel of the type set forth, of a jacket formed in separable upper and lower portions, and a screw-threaded connection between said portions: said upper portion engaging directly with said vessel and being non-rotatable thereon, and said lower portion inclosing the lower part of said vessel and being rotatable thereon.

3. The combination with a double walled vacuum bottle of the type set forth, of a jacket formed in separable upper and lower portions, said upper portion inclosing the neck and shoulder of the bottle, a screw-threaded connection between said portions, means for securing said upper portion non-rotatably to said vessel, and a central cylindrical support for the bottom of said bottle disposed in and secured to said lower portion.

4. The combination with a double walled vacuum bottle of the type set forth, having its neck inclined to one side of a jacket formed in two separable upper and lower portions, said upper portion inclosing the neck and shoulder of the bottle, and said lower portion inclosing the remainder of said bottle and externally threaded near its upper edge to engage an internal thread on said upper portion.

5. The combination with a double walled vacuum bottle of the type set forth, having its neck inclined to one side of a jacket formed in two separable upper and lower portions, said upper portion inclosing the neck and shoulder of the bottle and said lower portion inclosing the remainder of said bottle, and a central cylindrical support for the bottom of said bottle disposed in and secured to said lower portion.

6. The combination with a double walled vacuum vessel of the type set forth, having the edge of its mouth disposed in a plane at an angle inclined with reference to the longitudinal axis of the vessel, of a jacket inclosing said vessel and terminating at said mouth edge, and a depending lid hinged to said jacket and normally closing said mouth.

7. The combination with a double walled vessel having a rarefied space between its inner and outer walls, of a jacket therefor comprising separable upper and lower members, a centrally arranged standard uprising from the base of the jacket for removably supporting the vessel and a lid for the mouth of the vessel, hinged to the upper jacket member.

8. The combination with a double walled vessel having a rarefied space between its inner and outer walls, of a jacket therefor comprising separable upper and lower members, a centrally arranged standard uprising from the base of the jacket for removably supporting the vessel, a lid for the mouth of the vessel hinged to the upper jacket member and a handle carried by the lower jacket member.

In testimony, that I claim the foregoing as my invention, I have signed my name in presence of two witnesses, this sixth day of June 1908.

GUSTAV ROBERT PAALEN.

Witnesses:
HEINRICH RAUCHHOLZ,
WOLDEMAR HAUPT.